(12) United States Patent
Teragaito et al.

(10) Patent No.: US 11,325,201 B2
(45) Date of Patent: May 10, 2022

(54) RESISTANCE WELDING APPARATUS

(71) Applicant: HONDA MOTOR CO., LTD., Tokyo (JP)

(72) Inventors: Yohei Teragaito, Tochigi-ken (JP); Yoshito Otake, Tochigi-ken (JP); Takuya Furuno, Tochigi-ken (JP); Hiroshi Miwa, Tochigi-ken (JP); Takuya Hino, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 294 days.

(21) Appl. No.: 16/574,115

(22) Filed: Sep. 18, 2019

(65) Prior Publication Data
US 2020/0094347 A1    Mar. 26, 2020

(30) Foreign Application Priority Data
Sep. 20, 2018  (JP) .............................. JP2018-176272

(51) Int. Cl.
*B23K 11/31*    (2006.01)
*B23K 11/36*    (2006.01)
*B23K 11/11*    (2006.01)

(52) U.S. Cl.
CPC .......... *B23K 11/315* (2013.01); *B23K 11/115* (2013.01); *B23K 11/36* (2013.01)

(58) Field of Classification Search
CPC ... B23K 11/315; B23K 11/115; B23K 11/253; B23K 11/317; B23K 11/36; B23K 11/31; B23K 11/314; B23K 11/311; B23K 11/255; B23K 11/002; B23K 11/252; B23K 11/3018; B23K 11/3063; B23K 11/318; B23K 20/125; B23K 2101/06; B23K 9/0286; B23K 9/202
USPC ....... 219/109, 110, 119, 86.25, 86.41, 117.1, 219/86.51, 89, 91.1, 116, 136, 137.31, 219/137.62, 78.01, 86.32, 86.8, 90, 91.2, 219/93, 98
See application file for complete search history.

(56) References Cited

U.S. PATENT DOCUMENTS 7,067,768 B2 * 6/2006 Miwa .................... B23K 11/315
                                                  219/137.31
7,145,097 B2 * 12/2006 Leach ................... B23K 11/115
                                                  219/110
(Continued)

FOREIGN PATENT DOCUMENTS

CN    102101214    6/2011
JP    57-156659    10/1982
(Continued)

OTHER PUBLICATIONS

English translation of JP-5792988-B2 (Year: 2015).*
(Continued)

Primary Examiner — Dana Ross
Assistant Examiner — Chris Q Liu
(74) Attorney, Agent, or Firm — Amin, Turocy & Watson, LLP

(57) ABSTRACT

A welding gun includes a proximity restricting mechanism that is provided between a shaft and a cover member in a manner to surround the shaft and to be displaceable relative to the shaft in an axial direction in accordance with expansion and contraction of the cover member, and that restricts the cover member from approaching too closely the shaft.

6 Claims, 8 Drawing Sheets

(56) References Cited

U.S. PATENT DOCUMENTS

| | | | | |
|---|---|---|---|---|
| 8,001,868 B2* | 8/2011 | Palau | ................... | B25J 9/044 |
| | | | | 74/490.05 |
| 8,253,305 B2* | 8/2012 | Sato | ................... | B23K 11/36 |
| | | | | 310/323.18 |
| 8,525,078 B2 | 9/2013 | Miwa et al. | | |
| 8,754,347 B2* | 6/2014 | Murai | ................ | B23K 11/115 |
| | | | | 219/86.25 |
| 9,211,606 B2* | 12/2015 | Tiberghien | ........... | B23K 11/315 |
| 2005/0150873 A1* | 7/2005 | Schmitt-Walter | .... | B23K 11/314 |
| | | | | 219/86.32 |
| 2011/0147355 A1* | 6/2011 | Miwa | ................ | B23K 11/315 |
| | | | | 219/136 |

FOREIGN PATENT DOCUMENTS

| | | |
|---|---|---|
| JP | 06-182560 | 7/1994 |
| JP | 08-309558 | 11/1996 |
| JP | 4243774 | 3/2009 |
| JP | 5792988 B2 * | 10/2015 |

OTHER PUBLICATIONS

Chinese Office Action and Search Report for Chinese Patent Application No. 201910885455.9 dated Jan. 29, 2021.
Japanese Office Action for Japanese Patent Application No. 2018-176272 dated Mar. 24, 2020.

* cited by examiner

RESISTANCE WELDING APPARATUS

CROSS-REFERENCE TO RELATED APPLICATION

This application is based upon and claims the benefit of priority from Japanese Patent Application No. 2018-176272 filed on Sep. 20, 2018, the contents of which are incorporated herein by reference.

BACKGROUND OF THE INVENTION

Field of the Invention

The present invention relates to a resistance welding apparatus that welds a workpiece by conducting electricity through the workpiece via electrodes.

Description of the Related Art

Japanese Patent No. 4243774 discloses a spot welding gun (resistance welding apparatus) including an electrode moving mechanism that moves a movable electrode back and forth.

The electrode moving mechanism of this spot welding gun includes a screw axle (shaft) that rotates due to driving by a motor, a nut (support member) that screws onto the screw axle and is provided integrally with the mobile electrode, and a cover member that covers the screw axle and expands and contracts in accordance with the movement of the nut caused by the rotation of the screw axle.

SUMMARY OF THE INVENTION

In Japanese Patent No. 4243774, there is a concern that when the cover member approaches too closely the screw axle, the cover member cannot stably expand and contract.

It is an object of the present invention to provide a resistance welding apparatus that enables the cover member to stably expand and contract.

One aspect of the present invention is a resistance welding apparatus that welds a workpiece by conducting electricity through the workpiece via an electrode, the resistance welding apparatus comprising an electrode moving mechanism configured to move the electrode back and forth, wherein the electrode moving mechanism includes a first mechanism portion that has a shaft, a second mechanism portion that has a housing configured to house at least a portion of the shaft, the second mechanism portion being configured to support the shaft in a manner to be relatively movable in an axial direction, a cover member that has a bellows shape, and has a first end portion fixed to the first mechanism portion and a second end portion located on an opposite side to the first end portion and fixed to the second mechanism portion, the cover member being configured to cover at least a portion of the shaft and expand and contract in accordance with relative displacement between the first mechanism portion and the second mechanism portion, and a proximity restricting mechanism that is provided between the shaft and the cover member in a manner to surround the shaft and to be displaceable relative to the shaft in the axial direction in accordance with expansion and contraction of the cover member, the proximity restricting mechanism being configured to restrict the cover member from approaching too closely the shaft.

According to the present invention, the cover member is restricted from approaching too closely the shaft, and therefore the cover member can stably expand and contract.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The following describes preferred embodiments of a resistance welding apparatus according to the present invention, while referencing the accompanying drawings.

Figure 1:
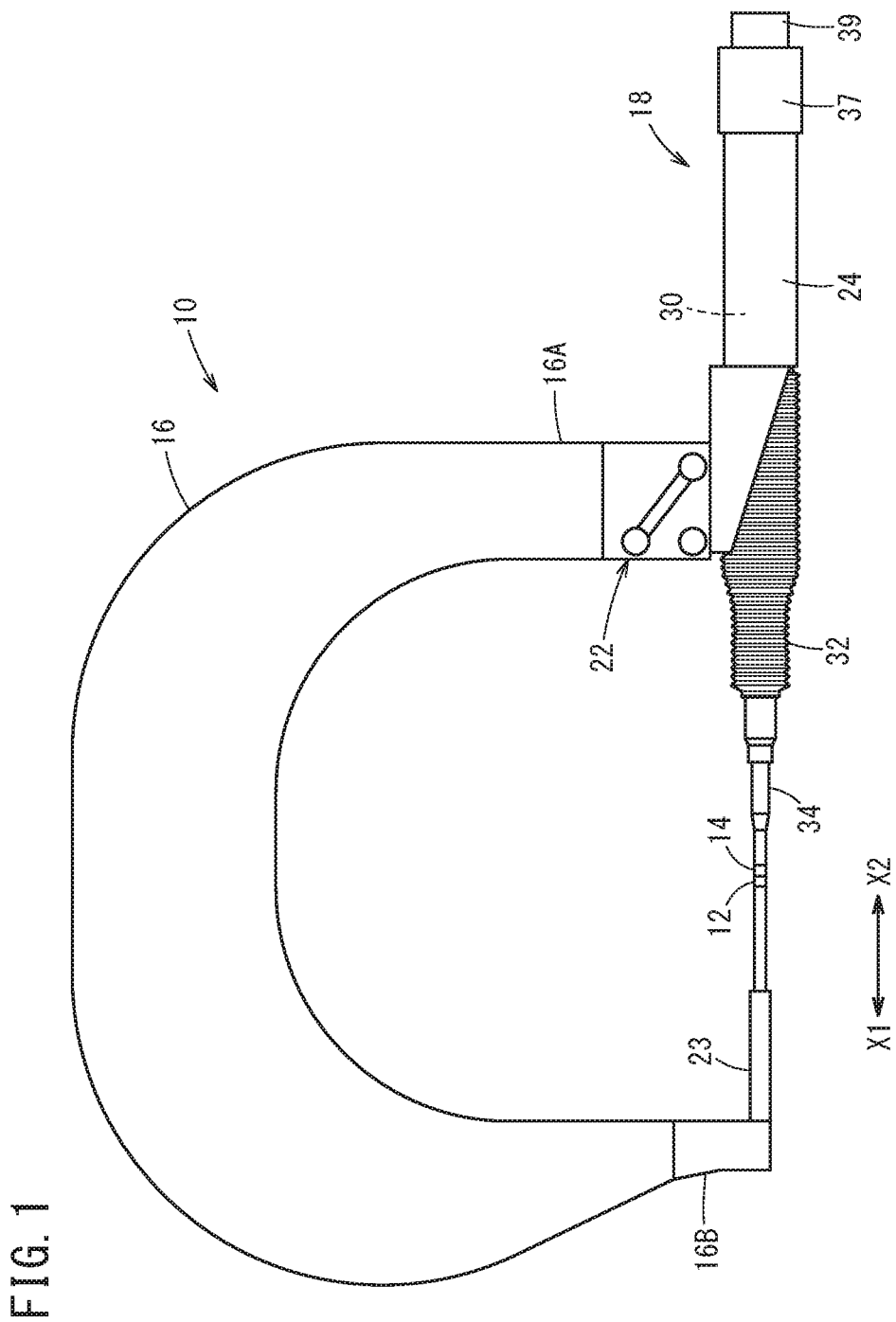
FIG. 1 is a side view of an overall configuration of a welding gun according to the present embodiment.

FIG. 1 is a side view of an example of a configuration of a welding gun (resistance welding apparatus) 10. The welding gun 10 is a resistance welding apparatus that welds a workpiece by conducting electricity through the workpiece via electrodes. Specifically, the welding gun 10 is a resistance welding apparatus that sandwiches and applies pressure to a workpiece, in which a plurality of boards are stacked, using a fixed electrode 12 and a movable electrode 14 and causes a welding current to flow between the fixed electrode 12 and the movable electrode 14, thereby performing spot bonding of the workpiece.

The welding gun 10 is used by a welding robot, for example. As shown in FIG. 1, the welding gun 10 includes, in addition to the fixed electrode 12 and the movable electrode 14, an arm 16 that holds the fixed electrode 12 and an electrode moving mechanism 18 that causes the movable electrode 14 to move back and forth. Specifically, the electrode moving mechanism 18 causes the movable electrode 14 to move in the X-axis direction, which is one axial direction including a direction toward the fixed electrode 12 (X1 direction) and a direction away from the fixed electrode 12 (X2 direction).

The arm 16 is formed by a substantially U-shaped member, and one end portion 16A of this U shape is attached to a housing 24, described further below, via an attachment portion 22. Another end 16B of this U-shaped arm 16 is provided with a long and thin electrode attaching member 23 that extends in the X2 direction from the other end 16B. The fixed electrode 12 is fixed on the X2-side end portion of the electrode attaching member 23.

Figure 2:
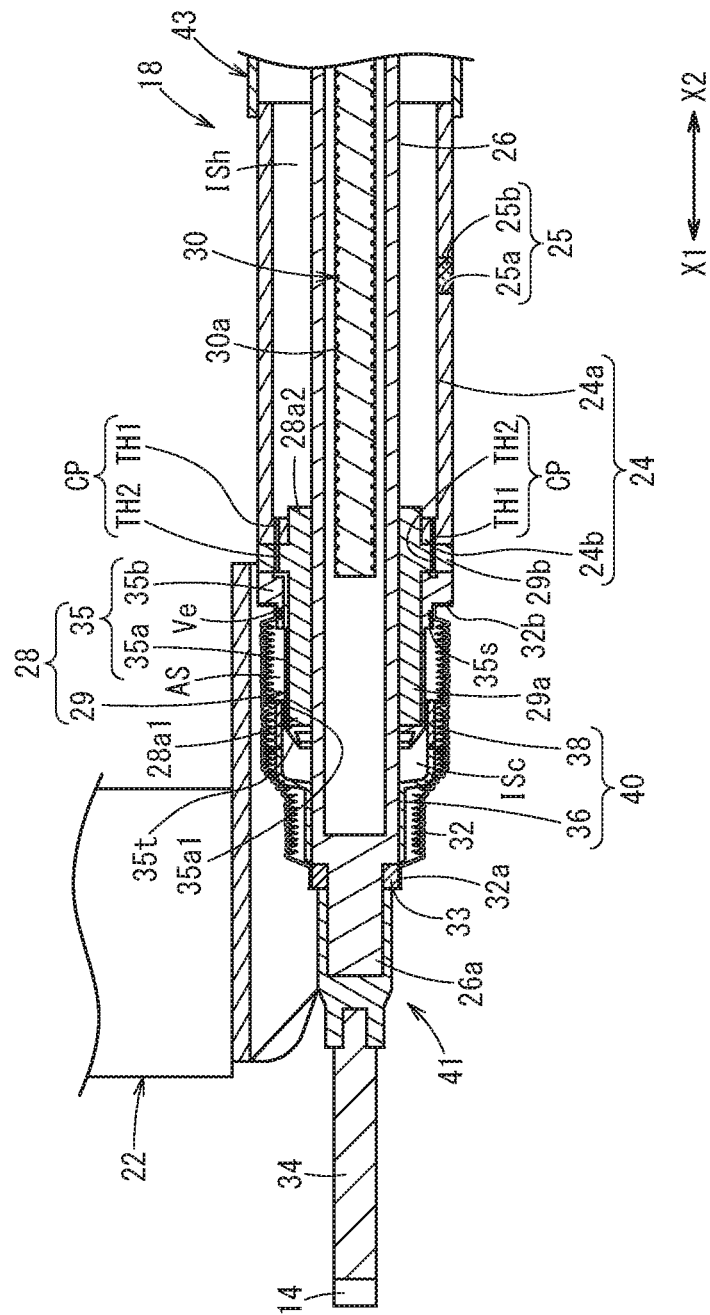
FIG. 2 is a cross-sectional view showing when an electrode moving mechanism of the welding gun is in a fully contracted state.
Figure 3:
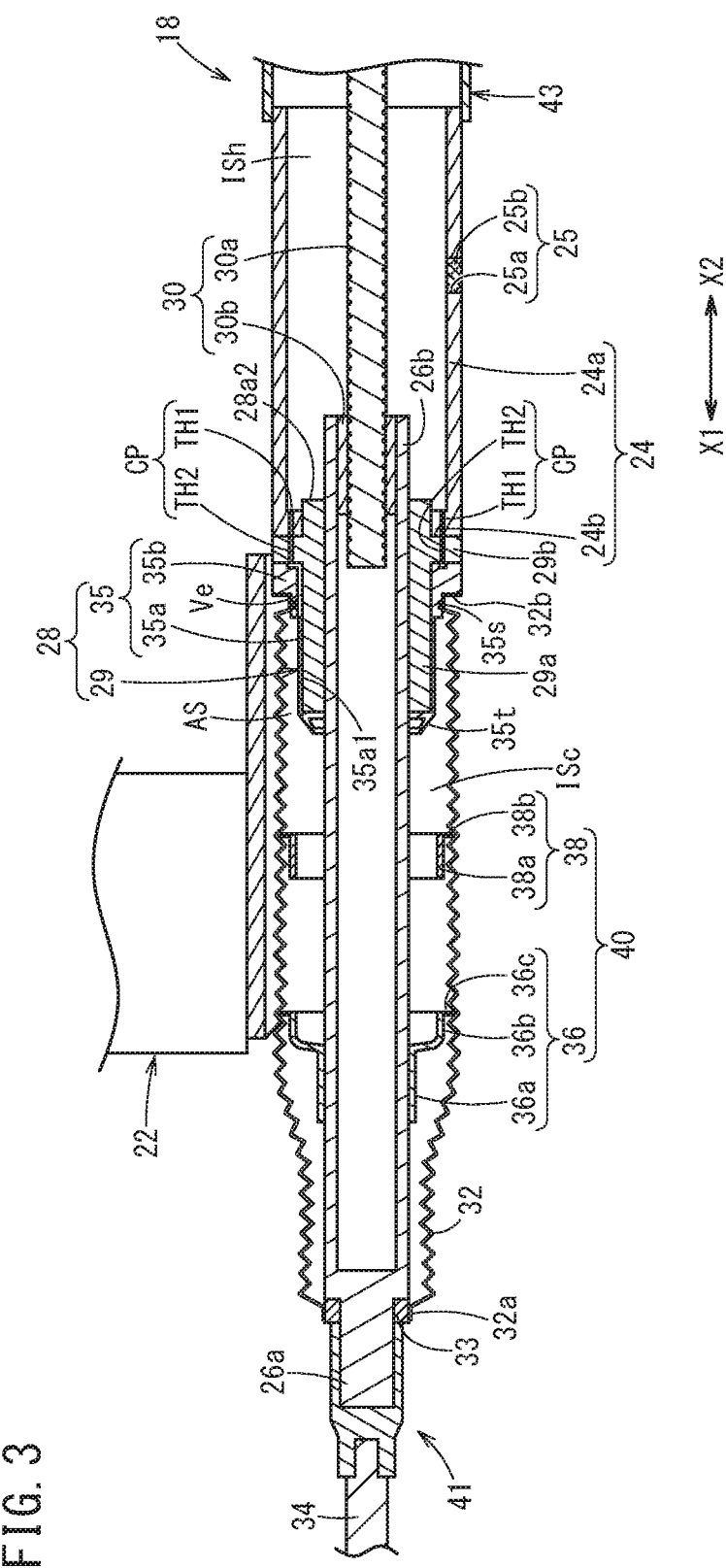
FIG. 3 is a cross-sectional view showing when the electrode moving mechanism of the welding gun is in a fully expanded state.

FIG. 2 is a cross-sectional view of the electrode moving mechanism 18 of the welding gun 10 and surrounding region when the electrode moving mechanism 18 is contracted (when the movable electrode 14 is farthest from the fixed electrode 12). FIG. 3 is a cross-sectional view of the electrode moving mechanism 18 of the welding gun 10 and surrounding region when the electrode moving mechanism 18 is expanded (when the movable electrode 14 is closest to the fixed electrode 12).

As shown in FIGS. 2 and 3, the electrode moving mechanism 18 includes a first mechanism portion 41 that holds the movable electrode 14, a second mechanism portion 43 capable of moving in the X-axis direction relative to the first mechanism portion 41, and a ball screw mechanism 30 for moving the first mechanism portion 41 and the second mechanism portion 43 relative to each other.

The first mechanism portion 41 includes a shaft 26 and an electrode attaching member 34 for attaching the movable electrode 14 to the shaft 26.

The shaft 26 is a hollow member that extends in the X-axis direction, and includes a front end portion 26a on the X1 side and a rear end portion 26b on the X2 side. The shaft 26 includes an open portion that opens in the X-axis direction, in each of the front end portion 26a and the rear end portion 26b. The movable electrode 14 is fixed to the front end portion 26a of the shaft 26, via the long and thin electrode attaching member 34 that extends in the X-axis direction (see FIG. 2). The movable electrode 14 faces the fixed electrode 12 in the X-axis direction (see FIG. 1). In other words, the movable electrode 14 and the fixed electrode 12 are positioned on the same axial line that is parallel to the X-axis. A portion of the shaft 26 is covered by a cover member 32 capable of expanding and contracting in accordance with relative displacement between the first mechanism portion 41 and the second mechanism portion 43.

The second mechanism portion 43 includes the housing 24 capable of housing at least a portion of the shaft 26, and a tube-shaped support structure 28 that supports the shaft 26.

The housing 24 is formed by a tube-shaped member capable of housing a portion of the shaft 26 (the portion on the X2 side) and having an axial direction that is the X-axis direction. The support structure 28 is attached at an X1-side open end portion of the housing 24. The housing 24 also functions as a gripping portion that is gripped by the welding robot.

As shown in FIG. 1, a motor 37 for driving the ball screw mechanism 30 is attached at the X2-side end portion of the housing 24. An encoder 39 that detects the rotational angle of a rotating shaft of the motor 37 is provided on the X2 side of the motor 37. The motor 37 is controlled by a control section (not shown in the drawings) of the welding robot, based on the detection result of the encoder 39.

As shown in FIGS. 2 and 3, the housing 24 includes a tube-shaped body portion 24a having an axial direction that is the X-axis direction and an annular first flange portion (inwardly protruding portion) 24b that protrudes radially inward from an X1-side end of the body portion 24a. In other words, the open end portion on the X1 side of the housing 24 protrudes radially inward. More specifically, the open end portion on the X1 side of the housing 24 overhangs radially inward with a ring shape.

An atmosphere opening portion 25 that enables communication between a space outside the housing 24 and an internal space ISh of the housing 24 is formed in the peripheral wall of the housing 24. The atmosphere opening portion 25 includes a through-hole 25a that penetrates through the peripheral wall of the housing 24 in the thickness direction and a filter member 25b arranged in the through-hole 25a. Here, the filter member 25b is arranged in the through-hole 25a, but may instead cover the through-hole 25a from inside or outside the housing 24.

The support structure 28 is provided between the shaft 26 and a position near a second end portion 32b of the cover member 32, and supports the shaft 26 in a manner to be slidable in the axial direction (X-axis direction). A portion of the support structure 28 (the X1-side portion) is covered by the cover member 32.

More specifically, the support structure 28 includes a tube-shaped support member 29 that is attached to the housing 24 and functions as a thrust bearing that supports the shaft 26 at an inner periphery thereof in a manner to be slidable in the axial direction, and a cover attachment member 35 that is attached to the support member 29.

The support member 29 includes a pipe-shaped portion 29a that extends in the X-axis direction and a second flange portion (flange portion) 29b that protrudes radially outward from the outer periphery of the pipe-shaped portion 29a. The pipe-shaped portion 29a is formed by a pipe-shaped portion inserted into the housing 24 and having an axial direction (direction of extension) that is the X-axis direction. The inner peripheral surface of the pipe-shaped portion 29a contacts the outer peripheral surface of the shaft 26. An X2-side end portion 28a2 of the pipe-shaped portion 29a is fitted into the inner peripheral surface of the first flange portion 24b of the housing 24.

The second flange portion 29b protrudes (overhangs with a ring shape) radially outward from a portion between an X1-side end portion 28a1 and the X2-side end portion 28a2 of the outer peripheral portion of the pipe-shaped portion 29a.

The cover attachment member 35 is a member for attaching the cover member 32 to the support structure 28.

The first flange portion 24b of the housing 24 and the second flange portion 29b of the support member 29 are bonded by being screwed together, for example, in a state where these portions are adjacent in the X-axis direction. In other words, the second flange portion 29b and the open end portion on the X1 side of the housing 24 are bonded together. At this time, the X2-side end surface of the first flange portion 24b and the X1-side surface of the second flange portion 29b are in contact.

The ball screw mechanism 30 includes a screw shaft 30a that extends in the X-axis direction and has a portion inserted into the shaft 26, in order to move the shaft 26 in the axial direction, and a nut 30b that screws onto the screw shaft 30a. As shown in FIG. 3, the nut 30b is fitted to (is fixed to) the rear end portion 26b of the shaft 26 in a manner to be positioned on the same axis as the shaft 26.

A drive force of the motor 37 (see FIG. 1) is transmitted to the screw shaft 30a as a rotational force around the X-axis. When the motor 37 operates, the screw shaft 30a rotates around the X-axis. When the screw shaft 30a rotates in one direction around the X-axis, the nut 30b, the shaft 26, and the movable electrode 14 move together in the X1 direction. When the screw shaft 30a rotates in the other direction around the X-axis, the nut 30b, the shaft 26, and the movable electrode 14 move together in the X2 direction. In other words, by causing the rotational shaft of the motor 37 to rotate in a forward direction or a reverse direction, it is possible to move the movable electrode 14 and the shaft 26 in the X1 direction or the X2 direction. When the electrode moving mechanism 18 is in the fully contracted state (see FIG. 2), the amount of the screw shaft 30a inserted into the shaft 26 becomes maximum. When the electrode moving mechanism 18 is in the fully expanded state (see FIG. 3), the amount of the screw shaft 30a inserted into the shaft 26 becomes minimum.

The cover member 32 is a bellows-shaped member that can expand and contract in the X-axis direction (e.g. a member made of rubber). An X1-side end portion of the cover member 32 (referred to below as a "first end portion 32a") is fixed to the first mechanism portion 41, and the X2-side end portion of the cover member 32 (referred to below as the "second end portion 32b") is fixed to the second mechanism portion 43. More specifically, the first end portion 32a of the cover member 32 is attached to a position near the front end portion 26a of the shaft 26 via an annular cover attachment member 33, and the second end portion 32b of the cover member 32 is attached to the cover attachment member 35 of the support structure 28 (see FIG. 4 as well). The cover member 32 is capable of expanding and contracting in accordance with the relative displacement between the first mechanism portion 41 and the second mechanism portion 43. The region between the shaft 26 and support structure 28, and the cover member 32 is a sealed space. This sealed space is also referred to below as an "internal space ISc".

More specifically, the cover attachment member 35 includes a tube-shaped fitting portion 35a that includes a fitting hole 35a1 into which the pipe-shaped portion 29a of the support member 29 is fitted, and an annular flange portion 35b that protrudes radially outward from the X2-side end portion of the outer periphery of the fitting portion 35a.

Figure 4:
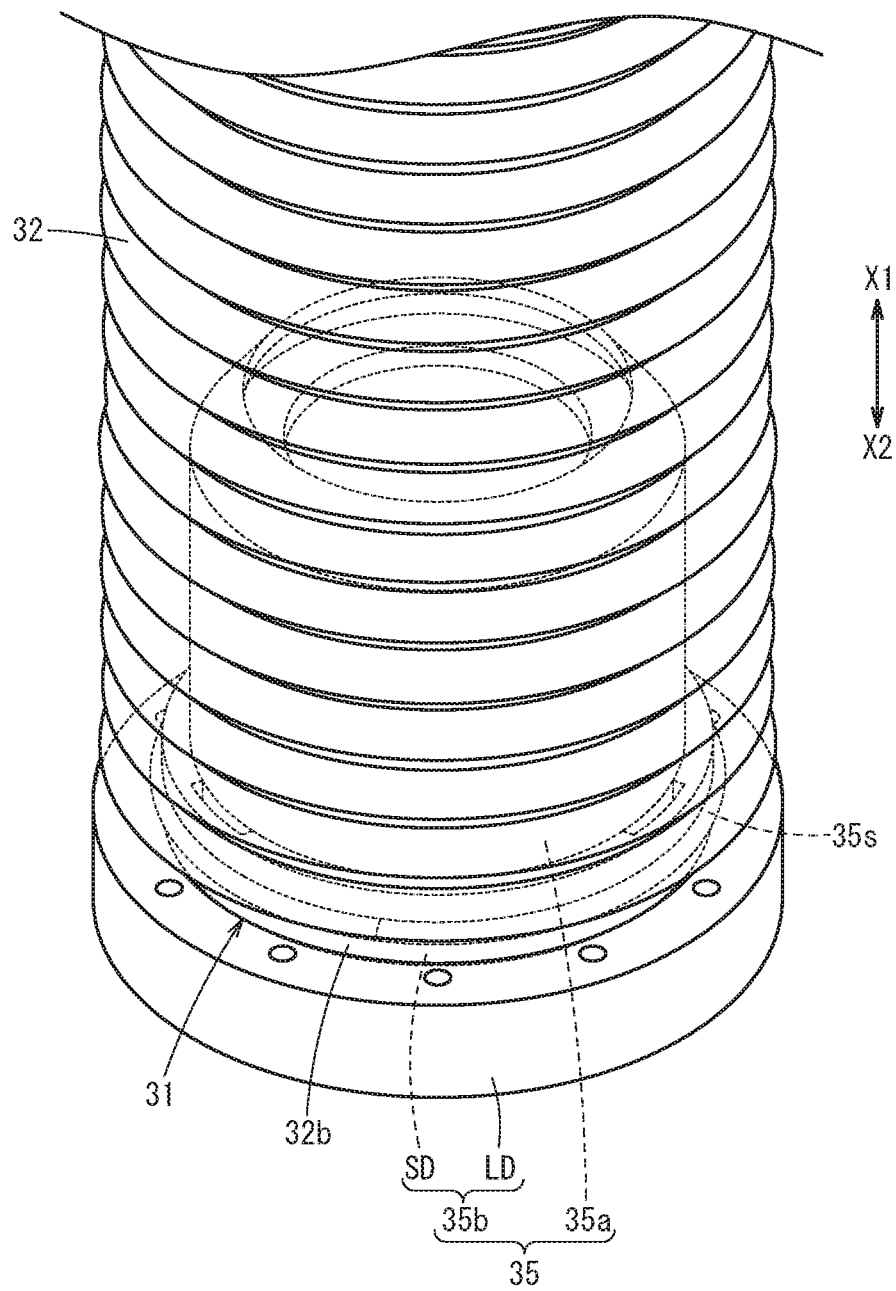
FIG. 4 is a perspective view of a cover attachment member and a portion of a cover member.
Figure 5:
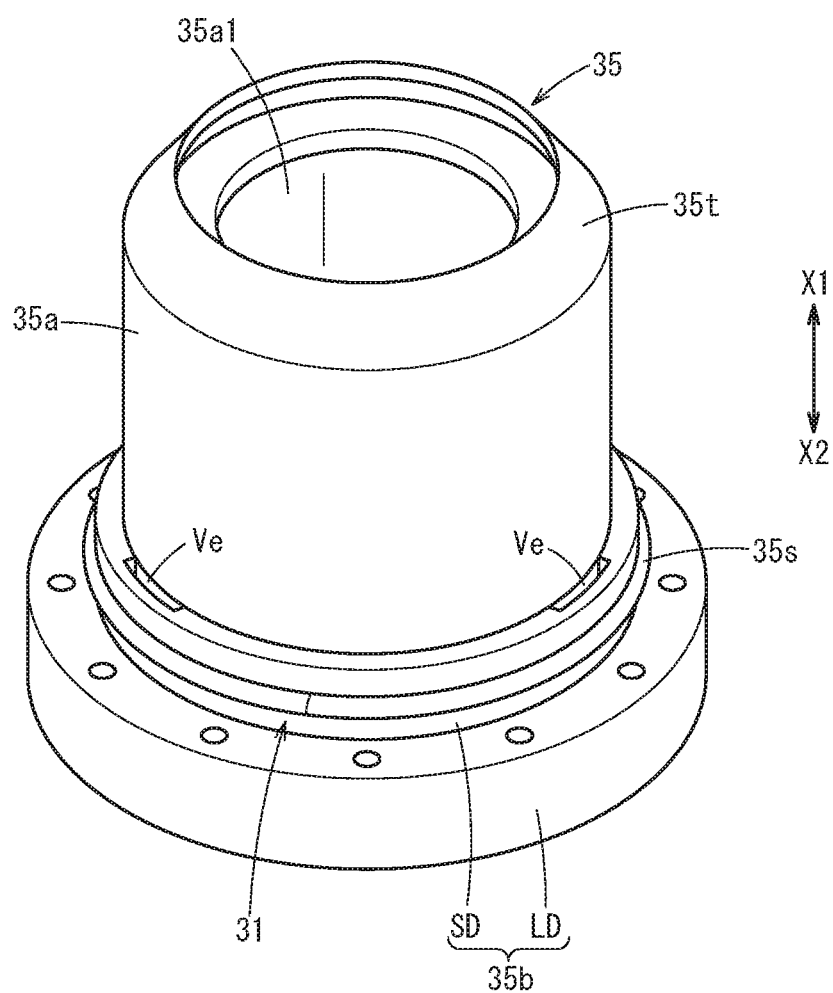
FIG. 5 is a perspective view of the cover attachment member.

As shown in FIGS. 4 and 5, the flange portion 35b includes a small diameter portion SD on the X1 side and a large diameter portion LD on the X2 side. A stepped portion 31 is formed by the small diameter portion SD and the large diameter portion LD. The second end portion 32b of the cover member 32 is attached to this stepped portion 31 (see FIG. 4). In other words, the small diameter portion SD is covered by the cover member 32. An annular seal member 35s is arranged between the small diameter portion SD and the second end portion 32b of the cover member 32. The large diameter portion LD of the flange portion 35b is fixed to the second flange portion 29b of the support structure 28, by being screwed, for example.

As shown in FIGS. 2 and 3, the outer periphery of the X1-side end portion (end portion on the side opposite the housing 24 side) of the fitting portion 35a has a tapered shape in which the diameter becomes smaller farther toward the X1 side. In other words, the X1-side end portion of the fitting portion 35a has an annular tapered surface 35t, the diameter of which becomes smaller farther toward the X1 side.

Here, as shown in FIGS. 2 and 3, a communication path CP enabling communication between the internal space ISc between the shaft 26 and the cover member 32 and the internal space ISh of the housing 24 is formed in the electrode moving mechanism 18. The communication path CP includes a first through-hole TH1 that penetrates through the first flange portion 24b of the housing 24 and a second through-hole TH2 that is in communication with the first through-hole TH1 and penetrates through the second flange portion 29b of the support structure 28.

A plurality (e.g. six) of the first through-holes TH1 are formed at uniform intervals in the circumferential direction of the first flange portion 24b. The X2-side end of each first through-hole TH1 is adjacent to the internal space ISh.

A plurality (the same number as the number of first through-holes TH1, e.g. six) of the second through-holes TH2 of the second flange portion 29b of the support structure 28 are formed at uniform intervals in the circumferential direction of the second flange portion 29b. The plurality of second through-holes TH2 correspond individually to the plurality of first through-holes TH1. In other words, each second through-hole TH2 is in communication with the corresponding first through-hole TH1. Specifically, the X1-side end of each first through-hole TH1 and the X2-side end of the corresponding second through-hole TH2 are adjacent to each other in the X-axis direction.

As shown in FIGS. 2, 3, and 5, a vent Ve penetrating through the flange portion 35b in the X-axis direction is formed in the small diameter portion SD of the flange portion 35b of the cover attachment member 35. A plurality (e.g. three) of the vents Ve are formed at uniform intervals in the circumferential direction of the flange portion 35b. Each vent Ve is a long hole that extends along the circumferential direction of the flange portion 35b, for example. The X1-side end of each vent Ve is adjacent to the internal space ISc. Each vent Ve is in communication with the internal space ISc and also in communication with each second through-hole TH2.

As understood from the above description, the internal space ISc and the internal space ISh are in communication via the plurality of vents Ve, the plurality of second through-holes TH2, and the plurality of first through-holes TH1. In other words, the communication path CP to enable communication between the internal space ISc and the internal space ISh is formed to include the plurality of vents Ve and the corresponding first through-holes TH1 and second through-holes TH2. The communication path CP is provided in the second flange portion 29b of the support structure 28, the first flange portion 24b of the housing 24, and the small diameter portion SD of the flange portion 35b of the cover attachment member 35. A plurality of the communication paths CP are provided at intervals in a circumferential direction centered on the axis of the shaft 26.

It should be noted that, in FIGS. 2 and 3, the inner diameter of the cover member 32 is designed to correspond to the outer diameter of the shaft 26. The cover member 32 expands and contracts in accordance with displacement of the shaft 26 in the axial direction when the electrode moving mechanism 18 expands or contracts. At this time, if the portion of the cover member 32 covering the shaft 26 is too close to the shaft 26 (if the cover member 32 is offset to far toward the shaft 26), there would be a concern that the cover member 32 cannot smoothly expand and contract. In other words, there is a concern that the cover member 32 would be unable to expand and contract stably. In this case, there is a concern that excessive force would be placed on the cover member 32, and the cover member 32 would be damaged (plastic deformation or the like).

During contraction, a majority portion of the cover member 32 sequentially moves from the outer periphery side of the shaft 26 to the outer periphery side of the support structure 28. At this time, there is a concern that the majority portion of the cover member 32 will become caught on the steps between the shaft 26 and the support structure 28, and the cover member 32 will not be able to smoothly move over these steps. In this case, there is a concern that not only the cover member 32 cannot stably contract, but the majority portion will be damaged (plastic deformation or the like).

Therefore, the welding gun 10 according to the present embodiment includes a proximity restricting mechanism 40 that restricts the cover member 32 from approaching too closely the shaft 26. The proximity restricting mechanism 40 is provided between the shaft 26 and the cover member 32, in a manner to surround the shaft 26 and to be displaceable in the axial direction relative to the shaft 26 in accordance with the expansion and contraction of the cover member 32.

In the present embodiment, the proximity restricting mechanism 40 includes a plurality of tube-shaped members arranged along the axial direction of the shaft 26. Specifically, the plurality of tube-shaped members include a first tube-shaped member 36 supported on the shaft 26 and a second tube-shaped member 38 that is arranged closer to the housing 24 side than the first tube-shaped member 36 and distanced from the shaft 26.

The first tube-shaped member 36 is an annular member arranged between the shaft 26 and the cover member 32 in a manner to surround the shaft 26. The first tube-shaped member 36 is provided to be displaceable in the X-axis direction relative to the shaft 26 in accordance with the expansion and contraction of the cover member 32. The outer periphery of the first tube-shaped member 36 supports the cover member 32 from inside the cover member 32.

More specifically, the first tube-shaped member 36 includes a sliding tube 36*a* having an inner surface formed to be slidable relative to the shaft 26, and a bulging portion 36*b* that has a larger diameter than the sliding tube 36*a* and is adjacent to the sliding tube 36*a* on the housing 24 side (X2 side). The sliding tube 36*a* is fitted to the shaft 26. The bulging portion 36*b* has an inner diameter that is slightly greater than the outer diameter of the pipe-shaped portion 29*a* of the support structure 28.

The first tube-shaped member 36 includes a collar-shaped outer end portion 36*c* that engages with the inner periphery of the cover member 32 at a position farther radially outward than the sliding tube 36*a*. The outer end portion 36*c* protrudes radially outward (overhangs with a ring shape) from the X2-side end portion of the bulging portion 36*b*. The outer diameter of the outer end portion 36*c* is greater than the outer diameter of the bulging portion 36*b*. The outer end portion 36*c* enters the valley of the bellows shape of the cover member 32. Due to this, the first tube-shaped member 36 can be set at a desired position in the X-axis direction relative to the cover member 32, and the first tube-shaped member 36 can also be moved in the X-axis direction in conjunction with the expansion and contraction of the cover member 32.

The second tube-shaped member 38 is an annular member arranged between the cover member 32 and at least the shaft 26 among the shaft 26 and the support structure 28, in a manner to surround at least the shaft 26. The outer periphery of the second tube-shaped member 38 supports the cover member 32 from inside the cover member 32. The second tube-shaped member 38 is displaceable in the X-axis direction relative to the shaft 26 and the support structure 28 in accordance with the expansion and contraction of the cover member 32.

More specifically, the second tube-shaped member 38 is arranged closer to the housing 24 side than the first tube-shaped member 36 and is distanced from the shaft 26. The second tube-shaped member 38 includes a trunk portion 38*a* having the same diameter as the bulging portion 36*b* of the first tube-shaped member 36, and a collar-shaped outer end portion 38*b* that engages with the inner periphery of the cover member 32. The outer end portion 38*b* protrudes radially outward (overhangs with a ring shape) from the X2-side end portion of the trunk portion 38*a*.

The inner diameter of the trunk portion 38*a* is slightly greater than the outer diameter of the pipe-shaped portion 29*a* of the support structure 28. The thickness of the second tube-shaped member 38 is equivalent to the thickness of the first tube-shaped member 36.

The outer diameter of the outer end portion 38*b* of the second tube-shaped member 38 is greater than the outer diameter of the trunk portion 38*a*. The outer end portion 38*b* enters the valley of the bellows shape of the cover member 32. Due to this, the second tube-shaped member 38 can be set at a desired position in the X-axis direction relative to the cover member 32, and the second tube-shaped member 38 can also be moved in the X-axis direction in conjunction with the expansion and contraction of the cover member 32.

Here, an annular space AS capable of receiving the second tube-shaped member 38 is formed between the support structure 28 and the cover member 32. As shown in FIG. 2, when the electrode moving mechanism 18 is contracted, at least a portion of the second tube-shaped member 38 is positioned between the cover member 32 and the support structure 28. As shown in FIG. 3, when the electrode moving mechanism 18 is expanded, the second tube-shaped member 38 is positioned farther toward the front end side (X1 side) than the support structure 28.

The following describes the operation and effect of the welding gun 10 configured as described above.

The control section of the welding robot sets the electrode moving mechanism 18 to be in the fully contracted state when the welding gun 10 is to be moved or the workpiece is to be replaced, as shown in FIG. 2. On the other hand, when the spot welding of the workpiece is performed using the welding gun 10, the control section of the welding robot sets the electrode moving mechanism 18 to be in the fully expanded state, as shown in FIG. 3, in order to sandwich and apply pressure to the workpiece with the fixed electrode 12 and the movable electrode 14. In other words, the control section of the welding robot drives the motor 37 to move the shaft 26 in the X1 direction, such that the movable electrode 14 moves closer to the fixed electrode 12.

At this time, the cover member 32 expands, and the volume of the internal space ISc of the cover member 32 increases. In accordance with this expansion of the cover member 32, gas flows from the internal space ISh of the housing 24 into the internal space ISc of the cover member 32 via each communication path CP, and gas flows from outside the housing 24 to the internal space ISh of the housing 24 via the atmosphere opening portion 25. In this way, the drop (change) in internal pressure of the cover member 32 is mitigated (restricted). As a result, damage to the cover member 32 is prevented, and it is possible to restrict the occurrence of large load fluctuations in a drive system including the motor 37. When the gas flows into the housing 24 via the atmosphere opening portion 25, foreign matter such as dust or dirt is prevented from entering the internal space ISh of the housing 24 along with this gas, due to the filtration effect of the filter member 25*b*.

When the electrode moving mechanism 18 is in the fully contracted state (see FIG. 2), the cover member 32 is not offset relative to the shaft 26 and can expand and contract in the direction of the axial line of the cover member 32 (X-axis direction), due to the effect of the first tube-shaped member 36 and the second tube-shaped member 38. In other words, a state is kept in which the inner diameter of the cover member 32 is greater than the outer diameter of the shaft 26 and also the axial line of the cover member 32 and the axial line of the shaft 26 substantially match.

When transitioning from the fully contracted state (see FIG. 2) to the fully expanded state (see FIG. 3), the majority portion of the cover member 32 on the X2 side expands in a state of being at a uniform distance from the shaft 26 (a state of not being offset relative to the shaft 26), and therefore expands while smoothly following the displacement of the shaft 26 in the X1 direction. At this time, the majority portion of the cover member 32 on the X2 side moves sequentially and smoothly from the annular space AS on the outer periphery side of the support structure 28 to the outer periphery side of the shaft 26. In accordance with the expansion of the cover member 32, the first tube-shaped member 36 moves in the X1 direction together with the corresponding portion of the cover member 32 (the valley portion into which the outer end portion 36c enters). In accordance with the expansion of the cover member 32, the second tube-shaped member 38 moves in the X1 direction together with the corresponding portion of the cover member 32 (the valley portion into which the outer end portion 38b enters). Then, upon reaching the fully expanded state (see FIG. 3), the first tube-shaped member 36 and the second tube-shaped member 38 are farthest from each other.

When the electrode moving mechanism 18 is in the fully expanded state (see FIG. 3), the cover member 32 is not offset relative to the shaft 26 and can expand and contract in the direction of the axial line of the cover member 32 (X-axis direction), due to the effect of the first tube-shaped member 36 and the second tube-shaped member 38. In other words, a state is kept in which the inner diameter of the cover member 32 is greater than the outer diameter of the shaft 26 and also the axial line of the cover member 32 and the axial line of the shaft 26 substantially match.

After the spot welding of the workpiece is finished, the control section of the welding robot causes the electrode moving mechanism 18 to transition from the fully expanded state (see FIG. 3) to the fully contracted state (see FIG. 2), in order to move the welding gun 10 or replace the workpiece. In other words, the control section of the welding robot drives the motor 37 to move the shaft 26 in the X2 direction, thereby moving the movable electrode 14 away from the fixed electrode 12.

At this time, as shown in FIG. 2, the cover member 32 contracts and the volume of the internal space ISc decreases. In accordance with this contraction of the cover member 32, gas flows from the internal space ISc of the cover member 32 to the internal space ISh of the housing 24 via the communication paths CP, and gas also flows from the internal space ISh of the housing 24 to the outside of the housing 24 via the atmosphere opening portion 25. Due to this, the increase (change) in the internal pressure of the cover member 32 is mitigated (restricted). As a result, damage to the cover member 32 is prevented, and it is possible to restrict the occurrence of large load fluctuations in the drive system including the motor 37.

When transitioning from the fully expanded state (see FIG. 3) to the fully contracted state (see FIG. 2), the majority portion of the cover member 32 on the X2 side contracts in a state of being at a uniform distance from the shaft 26 (a state of not being offset relative to the shaft 26), and therefore contracts while smoothly following the displacement of the shaft 26 in the X2 direction. At this time, the majority portion of the cover member 32 on the X2 side moves sequentially and smoothly from the outer periphery side of the shaft 26 to the annular space AS on the outer periphery side of the support structure 28.

In accordance with the contraction of the cover member 32, the first tube-shaped member 36 moves in the X2 direction together with the corresponding portion of the cover member 32 (the valley portion into which the outer end portion 36c enters). In accordance with the contraction of the cover member 32, the second tube-shaped member 38 moves in the X2 direction together with the corresponding portion of the cover member 32 (the valley portion into which the outer end portion 38b enters). Then, when the second tube-shaped member 38 reaches the X1-side end portion of the cover attachment member 35, the second tube-shaped member 38 is guided by the tapered surface 35t of this end portion to move smoothly to the outer periphery side (annular space AS) of the support structure 28 (cover attachment member 35), such that the electrode moving mechanism 18 enters the fully contracted state, as shown in FIG. 2. In the fully contracted state, the first tube-shaped member 36 and the second tube-shaped member 38 are closest to each other.

In the welding gun 10 according to the present embodiment described above, the communication path CP is formed enabling communication between the internal space ISc that is between the shaft 26 and the cover member 32 and the internal space ISh of the housing 24.

Therefore, when the cover member 32 expands and contracts in accordance with the relative displacement between the first mechanism portion 41 and the second mechanism portion 43, gas flows between the inside of the housing 24 and the inside of the cover member 32 via the communication path CP. Accordingly, it is possible to reduce the internal pressure change occurring when the cover member 32 expands and contracts, without decreasing the cover functionality.

In other words, in the welding gun 10, the internal space ISc of the cover member 32 substantially enlarges up to the internal space ISh of the housing 24 due to the communication path CP, and therefore it is possible to restrict the internal pressure change of the cover member 32 by at least an amount corresponding to the volume of the internal space ISh, without decreasing the cover functionality.

The communication path CP is formed in the second mechanism portion 43. In this way, the communication path CP is formed in the second mechanism portion 43 that supports the shaft 26, and therefore there is no need to provide a specialized member for forming the communication path CP.

The second mechanism portion 43 includes the tube-shaped support member 29 that is attached to the housing 24 and supports the shaft 26 at the inner periphery thereof to be slidable in the axial direction, and the communication path CP is formed in the support member 29. Due to this, the communication path CP can be formed easily.

The support member 29 includes the pipe-shaped portion 29a that extends in the axial direction and the second flange portion 29b that protrudes radially outward from the outer periphery of the pipe-shaped portion 29a, and the communication path CP is formed in the second flange portion 29b. Due to this, the communication path CP can be formed more easily.

The housing 24 includes the open end portion which is connected to the second flange portion 29b and into which the pipe-shaped portion 29a is inserted, the open end portion is provided with the first flange portion 24b that protrudes toward the inside of the open end portion, and the communication path CP includes the first through-holes TH1 that penetrate through the first flange portion 24b and the second through-holes TH2 that are in communication with the first through-holes TH1 and penetrate through the second flange portion 29b. Due to this, the communication path CP can be formed even more easily.

In other words, in the present embodiment, the first through-holes TH1 are formed in the first flange portion 24b, which is a portion where the housing 24 is bonded to the support structure 28, and the second through-holes TH2 that are in communication with the first through-holes TH1 are formed in the second flange portion 29b, which is a portion where the support structure 28 is bonded to the housing 24. Due to this, the communication path CP enabling communication between the internal space ISc and the internal space ISh can be formed even more easily.

A plurality of the communication paths CP are provided at intervals in the circumferential direction, centered on the axis of the shaft 26. Due to this, it is possible to sufficiently restrict the internal pressure change of the cover member 32.

The housing 24 includes the atmosphere opening portion 25 that includes the filter member 25b and enables communication between the space outside the housing 24 and the internal space ISh. Due to this, the internal space ISh of the housing 24 and the space outside the housing 24 are in communication via the atmosphere opening portion 25, and therefore it is possible to further restrict the internal pressure change of the cover member 32. Furthermore, due to the filter member 25b, it is possible to prevent foreign matter from intruding into the internal space ISh from the space outside the housing 24. Due to this, it is possible to prevent the occurrence of problems such as malfunction of the ball screw mechanism 30, the motor 37, and the like caused by foreign matter entering the internal space ISh.

By providing the housing 24 with the atmosphere opening portion 25, the internal space ISc of the cover member 32 is in communication with the space outside the housing 24 via the communication path CP and the internal space ISh of the housing 24, and therefore it is possible to sufficiently restrict the internal pressure change of the cover member 32.

On the other hand, if the atmosphere opening portion is provided to the cover member 32, it would be difficult to provide the filter member to the cover member 32, and so even though it would be possible to restrict the change in the internal pressure of the cover member 32, foreign matter would enter the cover member 32. When foreign matter enters the cover member 32, this foreign matter becomes stuck in a gap between the shaft 26 and the support structure 28, for example, and there is a concern that this would impede the displacement of the shaft 26.

The welding gun 10 according to the present embodiment includes the proximity restricting mechanism 40 that is provided between the shaft 26 and the cover member 32, in a manner to surround the shaft 26 and to be displaceable in the axial direction relative to the shaft 26 in accordance with the expansion and contraction of the cover member 32, and restricts the cover member 32 from approaching too closely the shaft 26.

Due to this, the cover member 32 is restricted from approaching too closely the shaft 26, and therefore the cover member 32 can expand and contract stably.

The proximity restricting mechanism 40 includes the outer end portions 36c and 38b that engage with the inner periphery of the cover member 32. Due to this, it is possible to move the proximity restricting mechanism 40 in conjunction with the expansion and contraction of the cover member 32.

The proximity restricting mechanism 40 includes the first tube-shaped member 36 that is supported on the shaft 26, and the first tube-shaped member 36 includes the sliding tube 36a having an inner surface that is formed to be slidable relative to the shaft 26, and the outer end portion 36c that engages with the inner periphery of the cover member 32 at a position farther radially outward than the sliding tube 36a. Due to this, it is possible to move the first tube-shaped member 36 in conjunction with the expansion and contraction of the cover member 32, while restricting offset of the cover member 32 relative to the shaft 26.

The outer end portions 36c and 38b enter valleys of the bellows shape of the cover member 32. Due to this, it is possible to move the proximity restricting mechanism 40 in conjunction with the expansion and contraction of the cover member 32, using a simple structure.

The proximity restricting mechanism 40 includes the plurality of tube-shaped members 36 and 38 arranged along the axial direction of the shaft 26. Due to this, the cover member 32 is restricted from approaching too closely the shaft 26 across a wide range, and therefore the cover member 32 can expand and contract more stably.

The plurality of tube-shaped members 36 and 38 include the first tube-shaped member 36 that is supported on the shaft 26 and the second tube-shaped member 38 that is arranged closer to the housing 24 side than the first tube-shaped member 36 and distanced from the shaft 26. Due to this, the cover member 32 is restricted from approaching too closely the shaft 26 across a wider range, and therefore the cover member 32 can expand and contract even more stably.

The second mechanism portion 43 includes, between the shaft 26 and a position near the second end portion 32b of the cover member 32, the tube-shaped support structure 28 that supports the shaft 26 to be slidable in the axial direction, and the annular space AS capable of receiving the second tube-shaped member 38 is formed between the support structure 28 and the cover member 32. The second tube-shaped member 38 is positioned farther toward the front end side than the support structure 28 when the electrode moving mechanism 18 is expanded, and at least a portion of the second tube-shaped member 38 is positioned in the annular space AS when the electrode moving mechanism 18 is contracted. Due to this, the cover member 32 can be guided stably to the annular space AS when the electrode moving mechanism 18 is contracted.

The outer periphery of the end portion of the support structure 28 on the side opposite the housing 24 side has a tapered shape. Due to this, the second tube-shaped member 38 can be guided stably to the annular space AS when the electrode moving mechanism 18 is contracted.

[Modifications]

The configuration of the welding gun 10 according to the embodiment described above can be altered as desired.

(First Modification)

A cylinder rod of a pressing cylinder may be used as the shaft of the present invention, and a bearing member that supports this cylinder rod at the inner periphery thereof in a slidable manner may be used as the support member (support structure) of the present invention.

(Second Modification)

In the embodiment described above, a plurality of the communication paths CP are provided at intervals in the circumferential direction centered on the axis of the shaft 26, but only one communication path CP may be provided.

(Third Modification)

In the embodiment described above, the communication paths CP are formed by the second through-holes TH2 formed in the support structure 28 serving as the support member (support structure) of the present invention, and the first through-holes TH1 formed in the housing 24 serving as the housing of the present invention, but the present invention is not limited to this. As an example, a communication path (e.g. a through-hole) enabling communication between the internal space ISc and the internal space ISh may be formed in the support structure 28. As an example, a communication path (e.g. a through-hole) enabling communication between the internal space ISc and the internal space ISh may be formed in the housing 24. However, in this case, it is necessary to also cover a portion of the housing 24 with the cover member 32.

(Fourth Modification)

In the embodiment described above, the second through-holes TH2 are formed in the second flange portion 29b of the support structure 28, but the present invention is not limited to this. As an example, at least some of the second through-holes TH2 may be formed in the pipe-shaped portion 29a.

(Fifth Modification)

The number, size, shape, and the like of the first through-holes TH1 formed in the housing 24 and the second through-holes TH2 formed in the support structure 28 can be altered as desired.

(Sixth Modification)

In the embodiment described above, the support structure 28 includes the cover attachment member 35, but the support structure 28 does not need to include the cover attachment member 35. In this case, the X2-side end portion of the cover member 32 may be attached to the pipe-shaped portion 29a or the second flange portion 29b. In this case, the communication paths CP are formed by the corresponding first through-holes TH1 and second through-holes TH2.

(Seventh Modification)

In the above embodiment, the communication paths CP are formed by the plurality of vents Ve and the corresponding first through-holes TH1 and second through-holes TH2, but the present invention is not limited to this. As an example, the internal space ISc and the internal space ISh may be caused to be in communication with each other by pipe-shaped members (e.g. pipes, tubes, hoses, or the like), and the insides of these pipe-shaped members may be the communication paths CP.

(Eighth Modification)

In the embodiment described above, the shaft 26 is hollow, but may instead be solid.

(Ninth Modification)

In the embodiment described above, a configuration is adopted in which the cover member 32 covers a portion of the shaft 26 (the majority portion thereof on the X2 side), but instead a configuration may be adopted in which the cover member 32 covers the entire shaft 26.

(Tenth Modification)

In the embodiment described above, the housing 24 includes the atmosphere opening portion 25 that includes the filter member 25b and enables communication between the space outside the housing 24 and the internal space ISh, but the present invention is not limited to this. As an example, the atmosphere opening portion 25 does not need to be included. In this case, the filter member 25b is unnecessary.

(Eleventh Modification)

Figure 6:
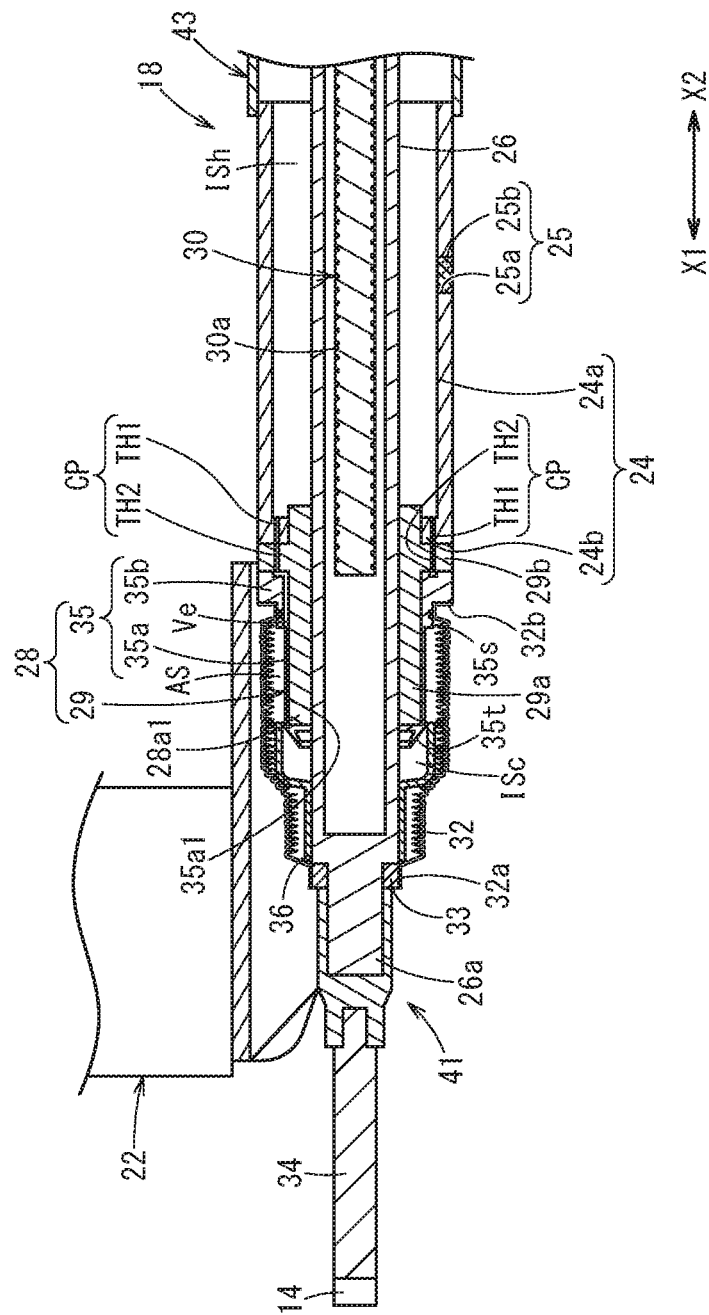
FIG. 6 is a cross-sectional view showing when an electrode moving mechanism of a welding gun according to an eleventh modification is in a fully contracted state.
Figure 7:
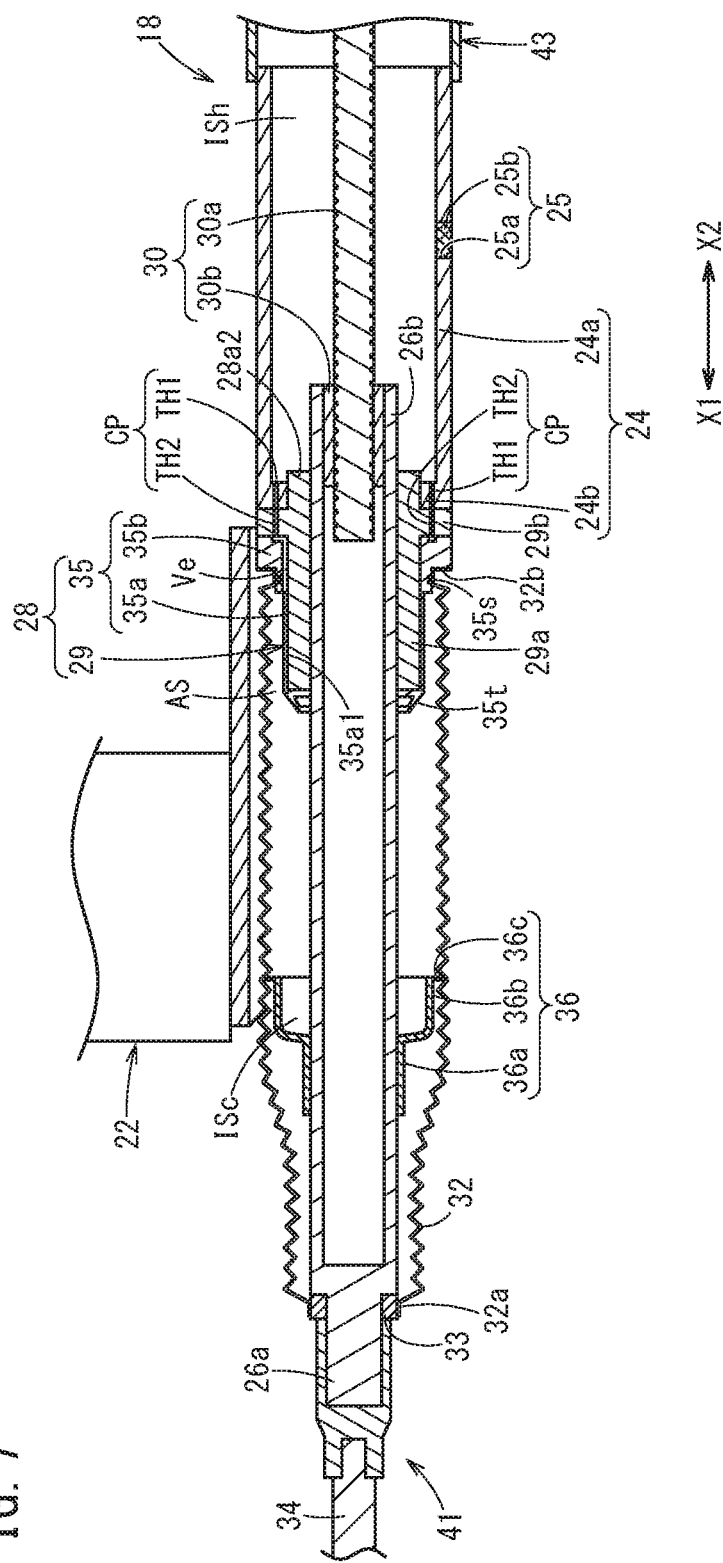
FIG. 7 is a cross-sectional view showing when the electrode moving mechanism of the welding gun according to the eleventh modification is in a fully expanded state.

In the embodiment described above, the first tube-shaped member 36 and the second tube-shaped member 38 are provided, but the second tube-shaped member 38 does not need to be provided, as in the eleventh modification shown in FIGS. 6 and 7. In this case, when the electrode moving mechanism 18 is in the fully contracted state, at least a portion of the bulging portion 36b of the first tube-shaped member 36 may be moved to the annular space AS on the outer periphery side of the support structure 28.

(Twelfth Modification)

In the embodiment described above, the length of the bulging portion 36b of the first tube-shaped member 36 in the X-axis direction is set to be less than the length of the sliding tube 36a in the X-axis direction, but the present invention is not limited to this. As an example, the length of the bulging portion 36b in the X-axis direction may be set to be greater than or equal to the length of the sliding tube 36a in the X-axis direction. In this case, when the electrode moving mechanism 18 is in the fully contracted state, at least a portion of the bulging portion 36b may be moved to the annular space AS on the outer periphery side of the support structure 28.

(Thirteenth Modification)

In the embodiment described above, the outer periphery of the end portion of the support structure 28 on the side opposite the housing 24 side has a tapered shape, but this outer periphery does not need to have a tapered shape.

(Fourteenth Modification)

Figure 8A:
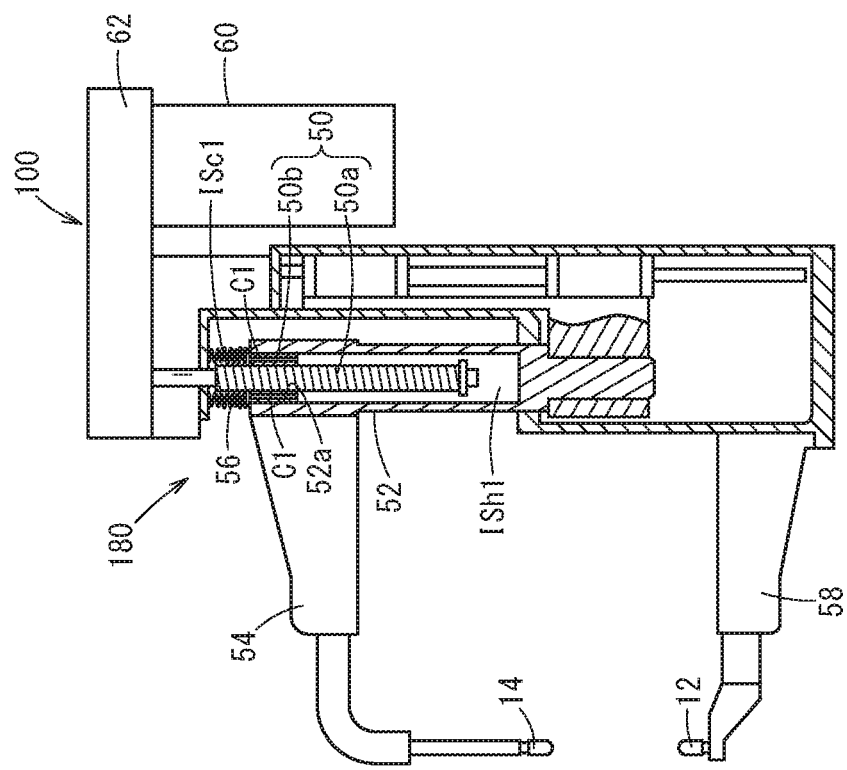
FIGS. 8A and 8B are each a side view of a partial cross section of an overall configuration of a welding gun according to a fourteenth modification.
Figure 8B:
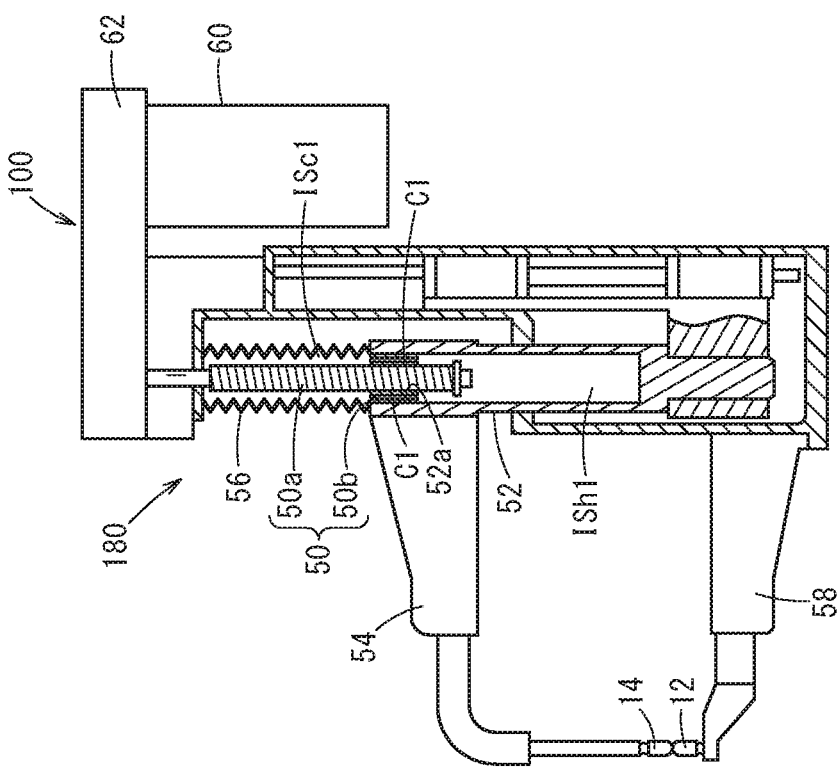

As shown by an electrode moving mechanism 180 of a welding gun 100 of the fourteenth modification shown in FIG. 8A, a screw shaft 50a of a ball screw mechanism 50 may be used as the shaft of the present invention, and a nut 50b that is screwed onto the screw shaft 50a of the ball screw mechanism 50 may be used as the support member (support structure) of the present invention. This nut 50b is fixed to an open end portion 52a of a housing 52. An arm 54 holding the movable electrode 14 is attached to a side surface of the housing 52. In other words, the movable electrode 14 and the nut 50b are provided integrally. A bellows-shaped cover member 56 covers the screw shaft 50a and a portion of the nut 50b. The nut 50b has a through-hole serving as a communication path C1 enabling communication between a sealed internal space ISc1, which is between the screw shaft 50a and nut 50b and the cover member 56, and an internal space ISh1 of the housing 52. When a drive force of a motor 60 is transmitted, via a drive mechanism 62, to the screw shaft 50a as a rotational force, the nut 50b, the housing 52, the arm 54, and the movable electrode 14 move together in the X-axis direction, relative to an arm 58 holding the fixed electrode 12, and the cover member 56 expands and contracts in the X-axis direction (see FIGS. 8A and 8B). At this time, gas flows between the internal space ISc1 and the internal space ISh1 via the communication path C1.

(Fifteenth Modification)

Any of the first to fourteenth modifications may be combined arbitrarily, as long as the combination does not result in a contradiction.

What is claimed is:

1. A resistance welding apparatus that welds a workpiece by conducting electricity through the workpiece via an electrode, the resistance welding apparatus comprising an electrode moving mechanism configured to move the electrode back and forth, wherein the electrode moving mechanism includes:
a first mechanism portion that has a shaft;
a second mechanism portion that has a housing configured to house at least a portion of the shaft, the second mechanism portion being configured to support the shaft in a manner to be relatively movable in an axial direction;
a cover member that covers at least a portion of the shaft, has a first end portion fixed to the first mechanism portion and a second end portion located on an opposite side to the first end portion and fixed to the second mechanism portion, and has a bellows expandable and contractible in accordance with relative displacement between the first mechanism portion and the second mechanism portion; and
a proximity restricting mechanism that is provided between the shaft and the cover member in a manner to surround the shaft and to be displaceable relative to the shaft in the axial direction in accordance with expansion and contraction of the cover member, wherein the proximity restricting mechanism includes a tube-shaped member supported on the shaft, and the tube-shaped member includes:

a sliding tube having an inner surface formed to be slidable relative to the shaft; and an outer end portion engaging with an inner periphery of the cover member at a position farther radially outward than the sliding tube, and the outer end portion restricts the cover member from approaching too close to the shaft.

2. The resistance welding apparatus according to claim 1, wherein the outer end portion enters a valley of the bellows shape of the cover member.

3. The resistance welding apparatus according to claim 1, wherein the proximity restricting mechanism includes a plurality of tube-shaped members arranged along the axial direction of the shaft.

4. The resistance welding apparatus according to claim 3, wherein the plurality of tube-shaped members include:

a first tube-shaped member supported on the shaft; and a second tube-shaped member arranged closer to a housing side than the first tube-shaped member and distanced from the shaft.

5. The resistance welding apparatus according to claim 4, wherein the second mechanism portion includes, between the shaft and a position near the second end portion of the cover member, a support structure having a tube shape and configured to support the shaft in a manner to be slidable in the axial direction, an annular space configured to receive the second tube-shaped member is formed between the support structure and the cover member, the second tube-shaped member is positioned farther toward a front end side than the support structure when the electrode moving mechanism is expanded, and at least a portion of the second tube-shaped member is positioned in the annular space when the electrode moving mechanism is contracted.

6. The resistance welding apparatus according to claim 5, wherein an outer periphery of an end portion of the support structure on a side opposite the housing side has a tapered shape.

\* \* \* \* \*